US008114503B2

(12) United States Patent
Klem, Jr.

(10) Patent No.: US 8,114,503 B2
(45) Date of Patent: Feb. 14, 2012

(54) METHOD AND APPARATUS FOR PREVENTING BIRDS FROM COLLIDING WITH OR STRIKING FLAT CLEAR AND TINTED GLASS AND PLASTIC SURFACES

(76) Inventor: Daniel Klem, Jr., Allentown, PA (US)

( * ) Notice: Subject to any disclaimer, the term of this patent is extended or adjusted under 35 U.S.C. 154(b) by 461 days.

(21) Appl. No.: 12/258,558

(22) Filed: Oct. 27, 2008

(65) Prior Publication Data

US 2009/0047487 A1  Feb. 19, 2009

Related U.S. Application Data

(63) Continuation-in-part of application No. 11/162,008, filed on Aug. 25, 2005, now abandoned.

(51) Int. Cl.
*B32B 17/00* (2006.01)
*B32B 3/10* (2006.01)

(52) U.S. Cl. ............... 428/195.1; 428/409; 428/426
(58) Field of Classification Search .............. 428/426, 428/409, 195.1
See application file for complete search history.

(56) References Cited

FOREIGN PATENT DOCUMENTS
EP  1 479 294 A2 * 11/2004
* cited by examiner

*Primary Examiner* — Gwendolyn Blackwell
(74) *Attorney, Agent, or Firm* — Design IP

(57) ABSTRACT

Clear or tinted window panes of glass or plastic having a pattern or dots, vertical lines, horizontal lines or a combination of vertical and horizontal lines in a regular pattern on a surface of the pane, the pattern being visible to the avian eye to prevent birds from striking or colliding with the window pane and having optical characteristics of ultraviolet reflection separated by ultraviolet absorption.

12 Claims, 4 Drawing Sheets

METHOD AND APPARATUS FOR PREVENTING BIRDS FROM COLLIDING WITH OR STRIKING FLAT CLEAR AND TINTED GLASS AND PLASTIC SURFACES

CROSS REFERENCE TO RELATED APPLICATION(S)

This application is a continuation-in-part of U.S. patent application Ser. No. 11/162,008, filed Aug. 25, 2005, which is incorporated by reference as if fully set forth.

BACKGROUND OF THE INVENTION

Field of Invention

The present invention pertains to the prevention of bird strikes against transparent and translucent building materials such as glass and plastic sheet materials. The invention can be used or incorporated as part of glass manufacturing; plastic manufacturing; glass coatings; plastic coatings; glass etching; plastic etching; ceramic frit; architecture; building development; landscaping; animal control, protection and welfare; conservation biology; ornithology.

SUMMARY OF THE INVENTION

This invention describes a means by which clear and reflective sheet (flat pane) glass and plastic will be rendered visible to birds. Birds behave as if clear and reflective sheet (flat pane) glass and plastic are invisible to them, and they fly into (strike) the glass or plastic resulting in their death or injury. Billions of birds are killed worldwide at sheet (flat pane) glass and plastic of all sizes and in all types of human structures. These are unintended deaths that can be avoided if sheet (flat pane) glass and plastic are modified in a way that birds will recognize and avoid it as a barrier. Creating patterns on sheet (flat pane) glass and plastic composed of individual elements ultraviolet reflective in the range of 300 to less than 400 nanometers wavelength that are separated by 2.5 centimeters (1 inch) or less with spaces between said ultraviolet reflecting portion of the pattern being ultraviolet absorbing in the range of 300 to less than 400 nanometers wavelength is known to transform the space occupied by sheet (flat pane) glass and plastic into a barrier that birds will see and avoid. The individual elements are ultraviolet reflecting in the range of 300 to less than 400 nanometers in wavelength and ultraviolet absorbing in the range of 300 to less than 400 nanometers in wavelength. This invention will save the lives of billions of birds worldwide, and among them the rare, threatened and endangered species that fall under the protection of the national laws of sovereign nations and international treaties.

DETAILED DESCRIPTION OF THE INVENTION

Figure 1:
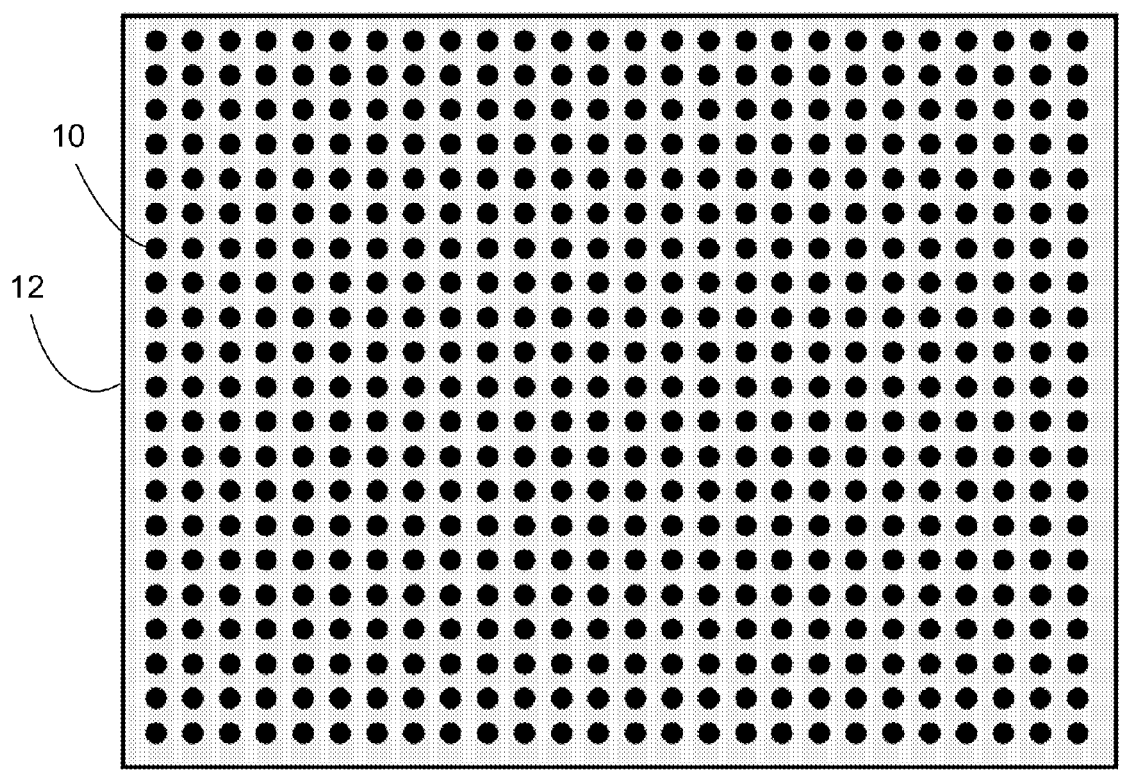
FIG. 1 is a schematic representation of a pattern of dots used in accord with the present invention.

Clear and reflective flat pane (sheet) glass and plastic as windowpanes in all manner of human structures are passive killers of birds worldwide. Birds behave as if clear and reflective glass and plastic are invisible to them, and they kill or injure themselves colliding with windows. Billions of birds are killed worldwide after colliding with glass and plastic. This unintended avian mortality factor can be eliminated using the bird-friendly sheet (flat pane) glass and plastic described herein. Extensive observations and experiments reveal that all birds are potentially vulnerable to the glass and plastic hazard and fatal collisions are possible wherever birds and glass and plastic mutually occur. Bird kills at glass and plastic are substantial, foreseeable, and avoidable, and at least within the United States it is reasonable to expect that birds merit protection from glass and plastic collisions under the purview of the Migratory Bird Treaty Act of 1918 and the Endangered Species Act of 1973, and may merit equal or similar protection from glass and plastic under the purview of laws of other sovereign nations and international treaties.

Through various means currently available to glass and plastic manufacturers and their allied product industries, a visible or invisible uniform pattern to the normal human eye can be created in flat pane (sheet) glass and plastic. If visible to the normal human eye the pattern is composed of elements that appear opaque or translucent and contrast with adjacent clear or reflective glass or plastic areas. The elements forming the pattern: (1) uniformly cover an entire pane (sheet), (2) are of any shape and size, and (3) are separated by 10 centimeters (4 inches) or less. Birds act as if the elements forming the pattern are visible to them when viewed from the exterior surface of clear and tinted sheet (flat pane) glass and plastic. This patterned glass and plastic are intended and for use in all human structures: commercial, residential, and any other designated functions containing sheet (flat pane) glass or plastic that face the outside environment. The patterns create a visual warning about the hazard of glass and plastic to birds in the environment. Wild birds avoid flying into (striking) these uniquely patterned-type glasses and plastics by behaving as if they recognize the space the glass occupies as a barrier to be avoided. For all means by which these patterns are created on any surface of single or a multiple-pane unit, the patterns are visible to birds and may or may not be visible to the normal human eye when looking at the exterior surface of the glass or plastic from the environment outside a human structure. Depending on the means by which the patterns are created, the patterns may or may not be visible to the normal human eye looking at (through) the glass or plastic from inside a human structure.

The sheet (flat pane) glass and plastic on which bird protection patterns are created is either inorganic glass prepared using float glass technology or any other means, and plastic sheets (flat pane) using any means of plastic technology. Inorganic glass sheets, plastic sheets, or a combination in laminated form producing the same visual effects will create effective bird protection from collisions.

Elements creating a protective pattern will be invisible to the normal human eye but will be visible to the avian eye if created using alternating ultraviolet (UV) reflective in the 300 nanometers to less than 400 nanometers wavelength range and ultraviolet absorption in the 300 to less than 400 nanometers wavelength range.

Technologies currently exist to create sheet (flat pane) glass and plastic with either of these visual effects for humans and birds. The following are known means to create protective patterns in sheet (flat pane) glass and plastic. Other means may also exist, and if so, they can be used to create the described avian protective patterns.

Coatings on any surface of a solid or laminated pane or panes that create a pattern by reflecting and absorbing ultraviolet (UV) wavelengths in the avian visual range and that are visible to birds in the glass or plastic when viewed from outside a human structure. These created patterns may or may not be visible to the normal human eye when viewing the glass or plastic from outside (exterior) a human structure, and these created patterns may not be visible to the normal human eye when viewing the glass or plastic from inside a human structure. Coatings are molecularly bonded or adhere by other means and are an integral part of the glass and plastic surface.

Translucent (frosted) elements can be used to create a pattern. Translucent (frosted) elements can be applied on any surface of a solid or laminated pane or panes if the glass or plastic are clear (transparent) and placed at see-through sites such as corridors or where corners meet in human structures; patterns at such sites are visible to normal human and avian eyes when viewing the glass or plastic from outside or inside a human structure. Translucent (frosted) elements used to create the pattern typically will be on the outside surface of tinted glass or plastic, or on any other surface such that the pattern is visible to normal human and avian eyes when viewing the glass from outside a human structure. Translucent (frosted) elements can be applied to glass or plastic surfaces by acid etching, etching by other means, sand blasting, ceramic frit technique involving temperatures in excess of 648.9 degrees Centigrade (1200 degrees Fahrenheit), or any other means.

A pattern visible to normal human and avian eyes when viewing glass or plastic from outside but not inside a human structure (type of one-way glass or plastic) can be created using coatings as a permanent integral part of the glass or plastic surface, external non-permanent films, and nanoparticle technology where nanoparticles creating the pattern are an integral part of the sheet (flat pane) glass or plastic. Non-permanent films crafted with the described bird-protecting patterns are available for use such as those manufactured by the 3M Company and used in advertising to create a visible pattern when viewing the glass surface from outside a structure (like buses); the pattern is not visible when viewing from inside a structure.

A novel pane showing an avian protection pattern that is visible to the normal human and avian eyes when viewing the glass from outside a human structure but not visible when viewing (looking out) from inside a human structure can be created using nanoparticles that are placed within the glass or plastic. The particles reflect visible light wavelengths that create an avian protection pattern when viewed from outside but not when viewed from the inside of a human structure.

Experiments testing the following specific designs have confirmed that birds can effectively detect and avoid patterns covering the entire glass or plastic surface created with ultraviolet reflective elements, the element being ultraviolet reflecting in the range of 300 to less than 400 nanometers wavelength: (1) 2.5 centimeters (1 inch) stripes placed 10 centimeters (4 inches) apart forming parallel vertical columns, (2) 2.5 centimeters (1 inch) stripes placed 5 centimeters (2 inches) apart forming parallel vertical columns, (3) 2.5 centimeters (1 inch) stripes placed 5 centimeters (2 inches) apart forming parallel horizontal rows, (4) 2.5 centimeters (1 inch) stripes placed 8 centimeters (3 inches) by 10 centimeters (4 inches) apart in parallel horizontal rows and vertical columns forming a mesh (checkerboard or lattice) pattern where the 8 centimeter (3 inches) distance is between horizontal rows and the 10 centimeter (4 inches) distance is between vertical columns, and (5) 2.5 centimeters (1 inch) stripes placed 5 centimeters (2 inches) apart in parallel vertical columns and horizontal rows forming a mesh (checkerboard or lattice) pattern with the spaces between the ultraviolet reflecting elements being ultraviolet absorbing in the range of 300 to less than 400 nanometers wavelength. The size (thickness of stripes, diameter of circles, dimensions of other shapes) of the elements making up the pattern must be at least 0.317 centimeter (0.125 inch) and may be increased. The spacing between elements making up the pattern may be increased from a minimum of 0.317 centimeter (0.125 inch) but must be no greater than 10 centimeters (4 inches) between a vertical column or 5 centimeters (2 inches) between a horizontal row to effect similar protection for birds. In any pattern the most effective detection by birds is achieved when the stripes or dots are ultraviolet reflecting in the 300 to less than 400 nanometers wavelength range and the spaces between the elements are ultraviolet absorbing in the 300 to less than 400 nanometers wavelength range. These same patterns will provide similar protection for birds and be invisible to the normal human eye if created with UV reflection and absorption.

A clear or tinted window pane can be constructed with a uniform pattern covering the outer surface of the pane, where the pattern is composed of elements that appear visible to the normal human eye when viewed from both the outside and inside environment of a structure; the size of the elements making up the pattern being 0.317 centimeter (0.125 inch) or greater with the spacing between elements being 0.317 centimeter (0.125 inch) to 10 centimeters (4 inches) if pattern elements are arranged in vertical columns or 5 centimeters (2 inches) if pattern elements are arranged in horizontal rows and obscure the ultraviolet reflecting elements and intervening ultraviolet absorbing spaces as discussed above.

The elements of the pattern will be invisible to the normal human eye created by substances placed on an outer surface of the single pane outer pane of a multiple pane unit that reflect ultraviolet wavelengths between 300 nanometers to less than 400 nanometers and absorb ultraviolet wavelengths between 300 and less than 400 nanometers between the ultraviolet reflecting portion of the pane.

Referring to FIG. 1, there is shown a regular pattern of dots embodying the present invention. Each of the dots is placed on the outer surface of a window pane 12 in a regular pattern as shown. Each of the dots has a minimum diameter of 0.317 centimeter (0.125 inch) and the dots are placed in a spaced apart relation to each other between 0.317 centimeter (0.125 inch) and 10 centimeters (4 inches) vertically and horizontally.

Figure 2:
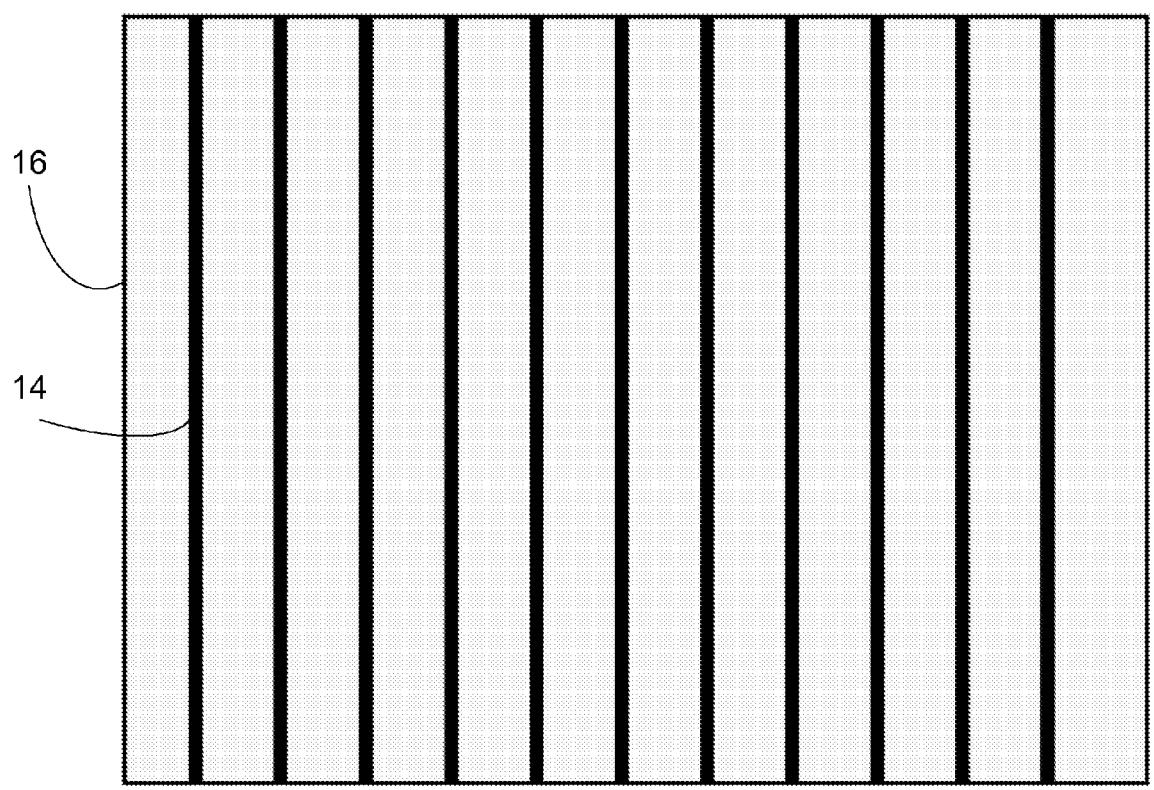
FIG. 2 is a schematic representation of a vertical line pattern used in accord with the present invention.

Referring to FIG. 2, there is shown a pane 14 having vertical stripes 16 which are between 0.317 centimeter (0.125 inch) and 2.5 centimeters (1 inch) in thickness and having a vertical spacing of 0.317 centimeter (0.125 inch) to 10 centimeters (4 inches).

Figure 3:
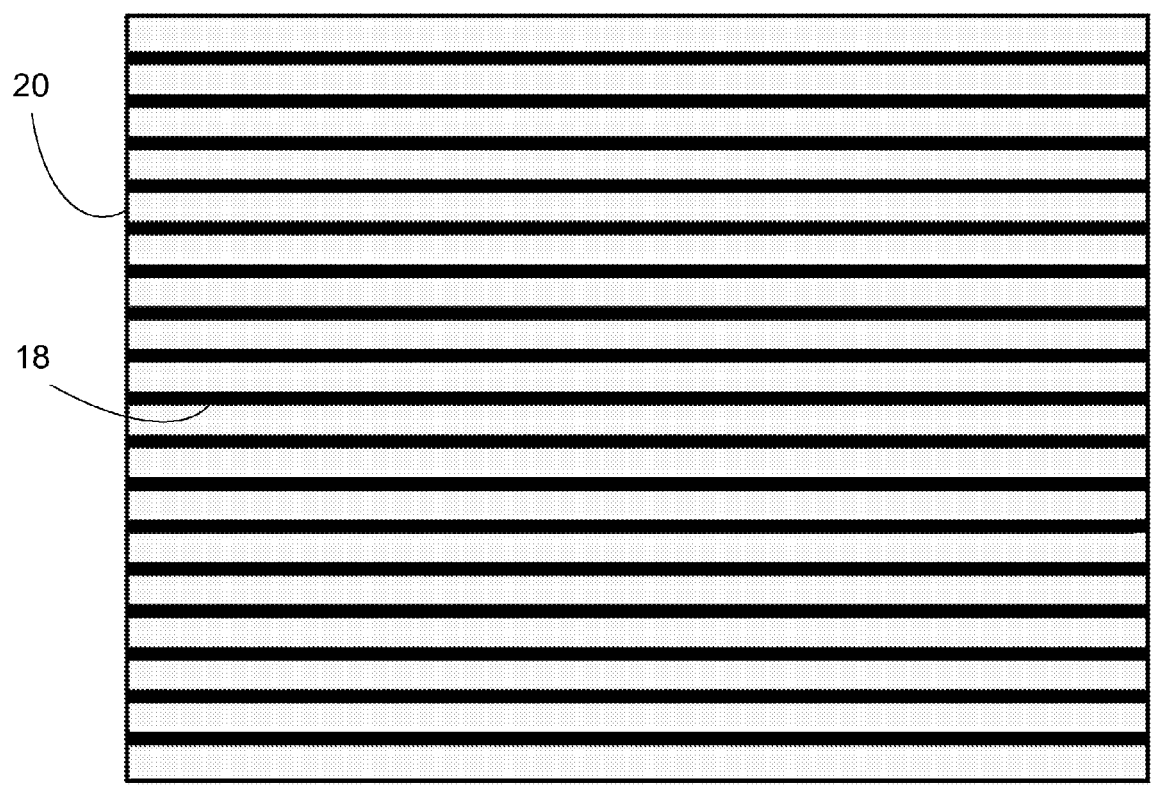
FIG. 3 is a schematic representation of a horizontal line pattern used in accord with the present invention.

Referring to FIG. 3, there is shown a window pane 18 having a regular pattern of horizontal elements or stripes 20 each of which has a thickness between 0.317 centimeter (0.125 inch) and 2.5 centimeters (1 inch) with the horizontal elements 20 spaced apart between 0.317 centimeter (0.125 inch) and 5 centimeters (2 inches).

Figure 4:
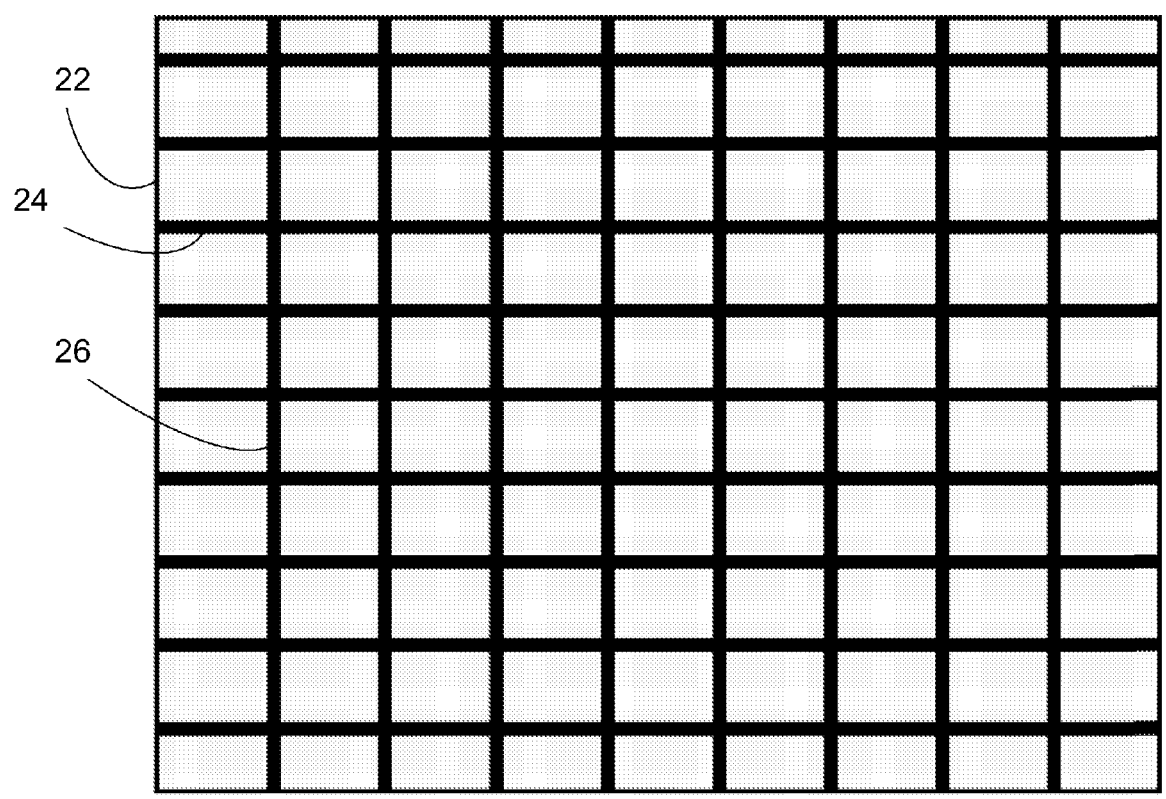
FIG. 4 is a schematic representation of a grid pattern used in accord with the present invention.

Referring to FIG. 4, there is shown a window pane 22 having a lattice or grid pattern of horizontal lines 24 and vertical lines 26 each of the lines having a thickness of between 0.317 centimeter (0.125 inch) and 2.5 centimeters (1 inch). The spacing of the vertical elements in the grid of FIG. 4 is between 0.317 centimeter (0.125 inch) and 10 centimeters (4 inches) and the spacing of the horizontal elements 24 of the grid are between 0.317 centimeter (0.125 inch) and 8 centimeters (3.125 inches).

An experiment was conducted over 90 days from 29 Oct. 2007 to 9 Feb. 2008, and tested a new clear UV-reflecting film, alone and in combination with an existing exterior clear UV-absorbing film from CPFilms, Inc. The clear film reflected effectively 80% UV. The experimental windows were: (1) clear glass control, (2) complete covering of clear UV-reflecting film applied to exterior surface (CUV-O); (3) same as 2 but applied to interior glass surface (CUV-I); (4) 2.5 cm wide UV-reflecting film stripes oriented vertically and separated by 5 cm UV-absorbing film stripes oriented vertically and applied to the outside glass surface (S-1R); (5) 5 cm wide UV-reflecting film stripes oriented vertically and separated by 2.5 cm UV-absorbing film stripes oriented vertically and applied to the outside glass surface (S-2R-O); (6) same as 5 but applied to the interior glass surface (S-2R-I), and (7) a grid pattern consisting of 10 cm wide UV-reflecting vertical columns separated by 2.5 cm wide UV-absorbing vertical columns, and 8 cm wide UV-reflecting horizontal rows separated by 2.5 cm wide UV-absorbing horizontal rows applied to the outside glass surface (GRID).

A total of 86 strikes were recorded in their experiment; 13 (15%) were fatal. The total number of strikes differed significantly across all treatments, with 60 (70%) at the clear glass control, 8 (9%) at CUV-O, 7 (8%) at CUV-I, 2 (2%) at S-1R, 1 (1%) at S-2R-O, 4 (5%) at S-2R-I, and 4 (5%) at the GRID ($\chi^2=219.23$, df=6, P<0.001). All 13 fatalities occurred at the clear glass control and were: 1 Black-capped Chickadee, 1 White-breasted Nuthatch, 2 House Finches, 1 American Goldfinch, 1 American Tree Sparrow, and 7 Dark-eyed Juncos.

From the foregoing it has been observed that the most effective deterrent to bird collision with glass panels is achieved by a regular pattern of alternatively ultraviolet reflecting and ultraviolet absorbing materials.

Having thus described my invention what is desired to be secured by Letters Patent of the United States is set forth in the appended claims.

What is claimed is:

1. A generally flat window pane having created on a surface of said pane a uniform pattern of elements, said elements having optical characteristics of ultraviolet reflection in a range of from 300 to less than 400 nanometers in wavelength separated by ultraviolet absorption in a range of from 300 to less than 400 nanometers in wavelength, wherein said elements are dots having a minimum diameter of 0.317 centimeter (0.125 inch) spaced apart from each other a distance of from 0.317 centimeter (0.125 inch) to 10 centimeters (4 inches).

2. A generally flat window pane having created on a surface of said pane a uniform pattern of elements, said elements having optical characteristics of ultraviolet reflection in a range of from 300 to less than 400 nanometers in wavelength separated by ultraviolet absorption in a range of from 300 to less than 400 nanometers in wavelength, wherein said elements are vertical lines having a minimum width of 0.317 centimeter (0.125 inch) spaced apart from each other a distance of from 0.317 centimeter (0.125 inch) to 10 centimeters (4 inches).

3. A generally flat window pane having created on a surface of said pane a uniform pattern of elements, said elements having optical characteristics of ultraviolet reflection in a range of from 300 to less than 400 nanometers in wavelength separated by ultraviolet absorption in a range of from 300 to less than 400 nanometers in wavelength, wherein said elements are horizontal lines having a minimum width of 0.317 centimeter (0.125 inch) spaced apart from each other a distance of from 0.317 centimeter (0.125 inch) to 5 centimeters (2 inches).

4. A window pane according to claim 1 fabricated from glass.

5. A window pane according to claim 1 fabricated from plastic.

6. A window pane according to claim 1 having optical characteristics being one of transparent or tinted.

7. A window pane according to claim 1 wherein the elements are placed on one of an inner or outer surface of said window pane.

8. A generally flat window pane being one of glass or plastic having created on a surface of said pane a pattern of vertical elements, said elements having a thickness of from 0.317 centimeter (0.125 inch) to 2.5 centimeters (1 inch) with said elements spaced apart from each other between 0.317 centimeter (0.125 inch) and 10 centimeters (4 inches) and said elements being ultraviolet reflecting between 300 to less than 400 nanometers in wavelength separated by spaces ultraviolet absorbing between 300 to less than 400 nanometers in wavelength.

9. A generally flat window pane having on a surface of said pane a pattern of horizontal elements, said elements having a thickness of from 0.317 centimeter (0.125 inch) to 2.5 centimeters (1 inch) with said elements spaced apart from each other between 0.317 centimeter (0.125 inch) and 5 centimeters (2 inches), and said elements are ultraviolet reflecting between 300 to less than 400 nanometers in wavelength with spaces between said elements being ultraviolet absorbing between 300 to less than 400 nanometers in wavelength.

10. A generally flat window pane having on a surface of said pane a pattern in the form of a grid comprised of vertical and horizontal elements, said vertical elements being a minimum thickness of between 0.317 centimeter (0.125 inch) and vertical elements placed in generally parallel columns between 0.317 centimeter (0.125 inch) and 10 centimeters ($\infty$ inches) apart, said horizontal elements being a minimum thickness of between 0.317 centimeter (0.125 inch) disposed in generally parallel rows between 0.317 centimeter (0.125 inch) and 5 centimeters (2 inches) apart wherein said vertical and horizontal elements form a grid pattern and where alternate vertical and horizontal elements are ultraviolet reflecting in the range of 300 to less than 400 nanometers wavelength and spaces between said elements are ultraviolet absorbing in the range of 300 to 400 nanometers wavelength.

11. A window pane according to claim 10 wherein said vertical and horizontal elements are 2.5 centimeters (1 inch) in width.

12. A window pane according to claim 10 wherein said vertical and horizontal elements are 0.317 centimeters (0.125 inch) in width.

* * * * *